Nov. 10, 1953  G. A. WAHLMARK  2,658,456
FLUID DISPLACEMENT DEVICE
Filed July 29, 1948  10 Sheets-Sheet 1
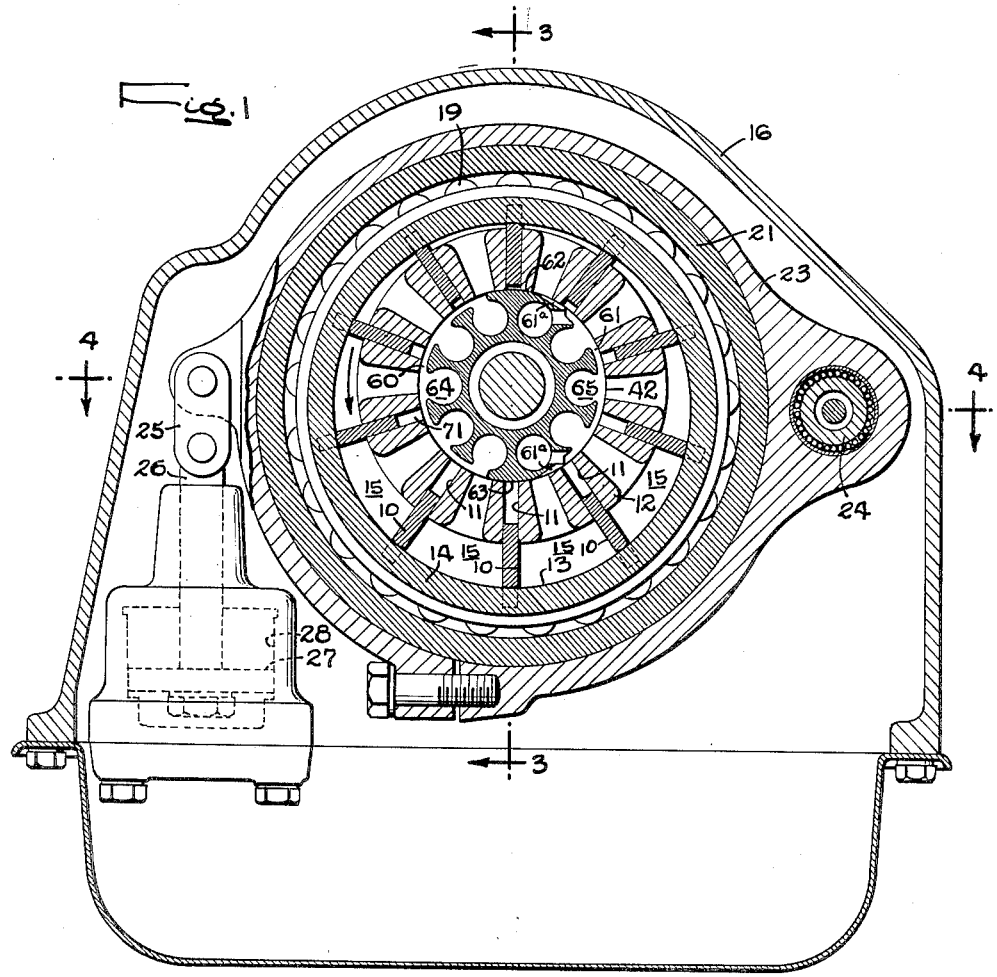

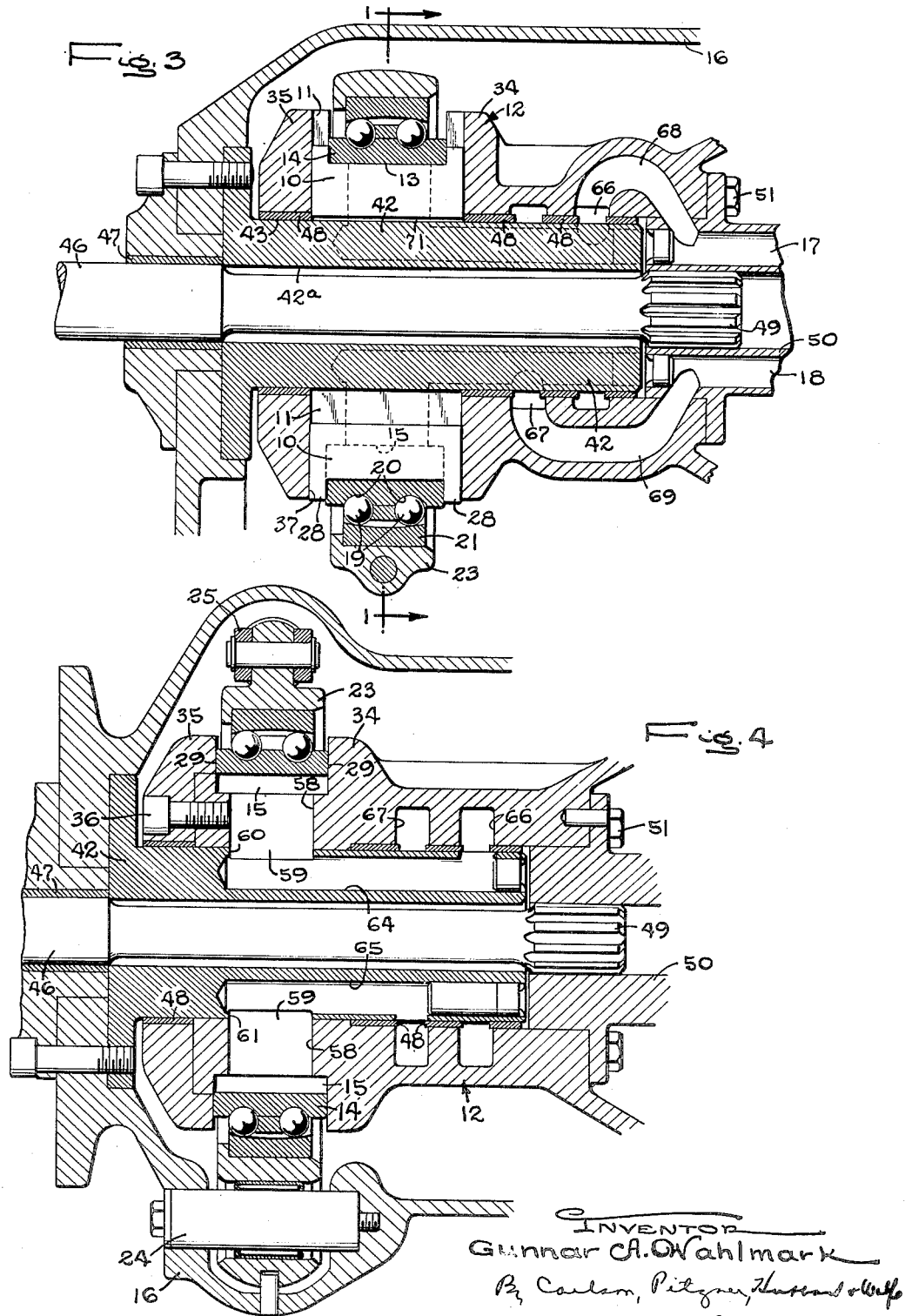

Nov. 10, 1953 G. A. WAHLMARK 2,658,456
FLUID DISPLACEMENT DEVICE
Filed July 29, 1948 10 Sheets-Sheet 3
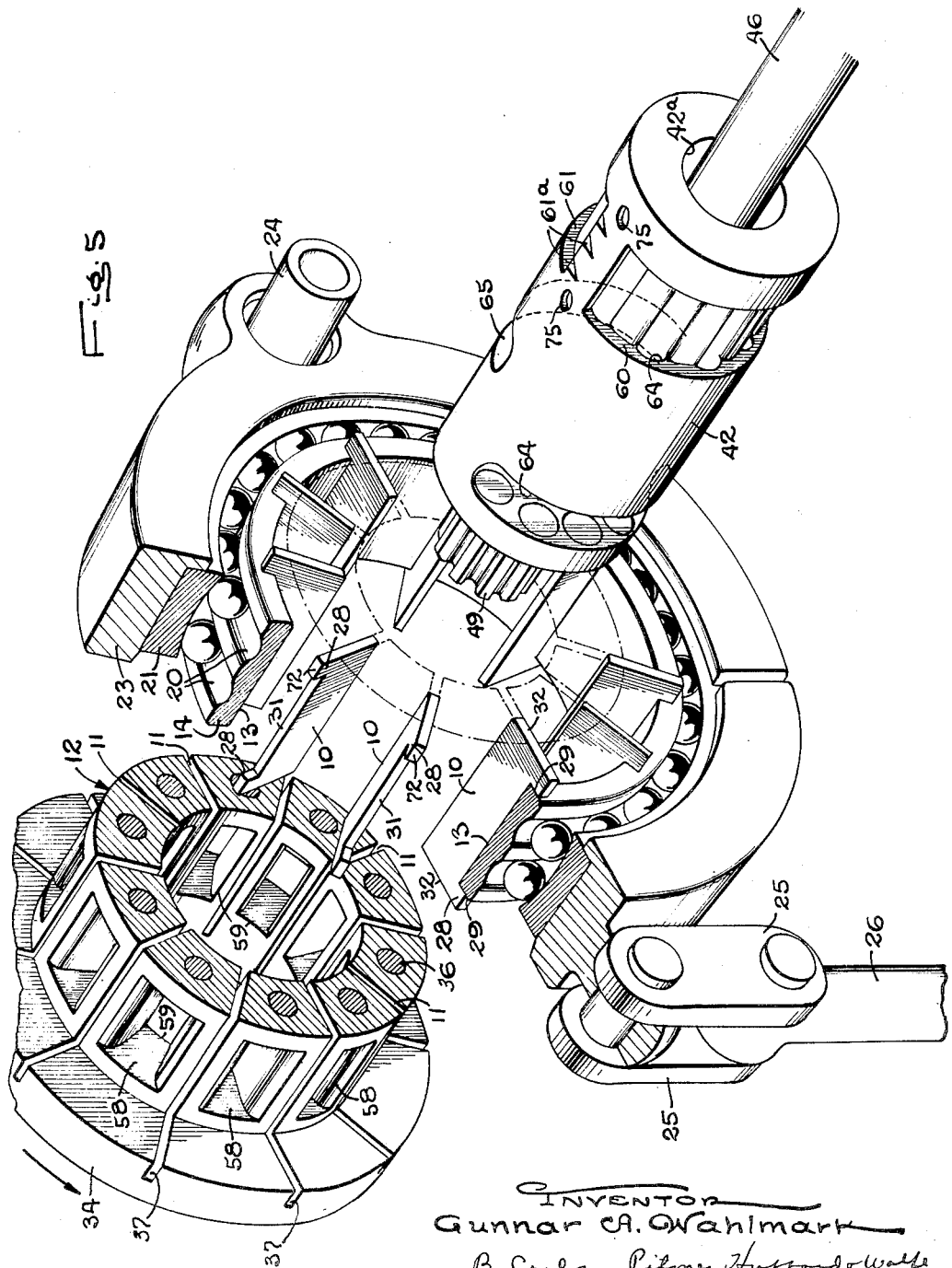
INVENTOR
Gunnar A. Wahlmark
By Carlson, Pitzner, Hubbard & Wolfe
ATTORNEY Nov. 10, 1953 G. A. WAHLMARK 2,658,456
FLUID DISPLACEMENT DEVICE
Filed July 29, 1948 10 Sheets-Sheet 4

INVENTOR
Gunnar A. Wahlmark
By Carlson, Pitzner, Hubbard-Wolfe
ATTORNEY

Nov. 10, 1953 G. A. WAHLMARK 2,658,456
FLUID DISPLACEMENT DEVICE
Filed July 29, 1948 10 Sheets-Sheet 5
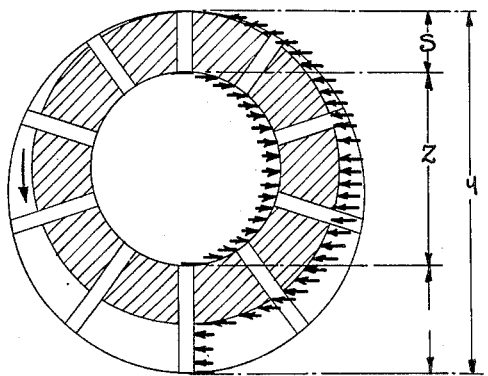
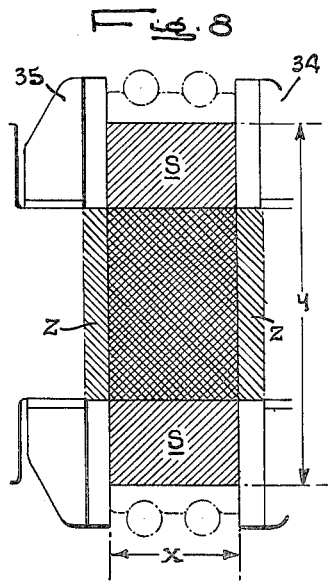
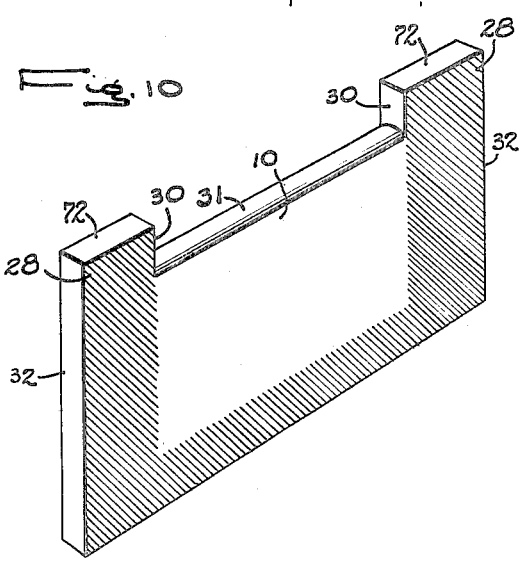
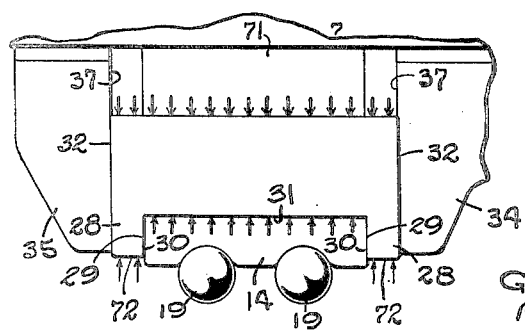

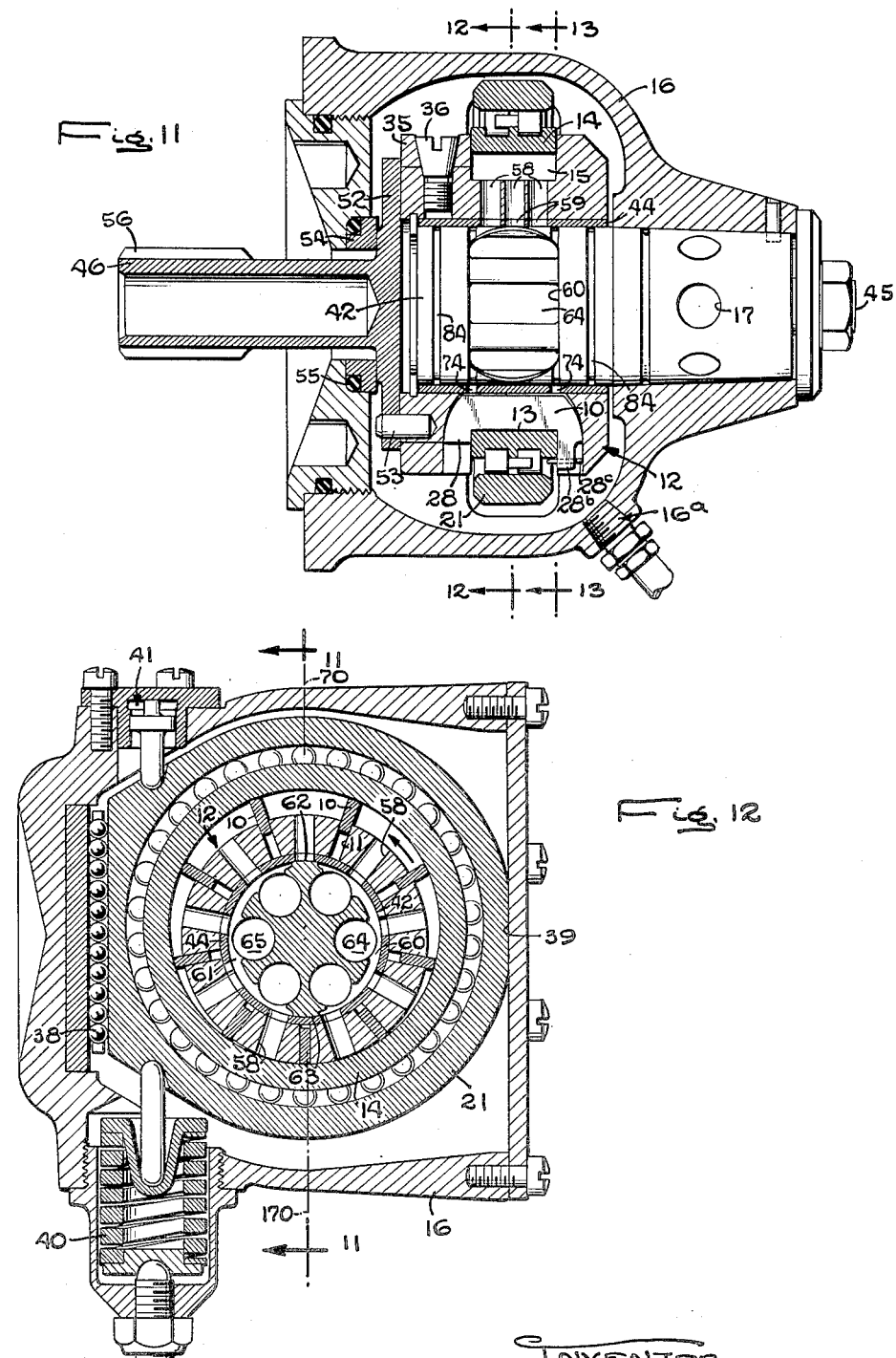

Nov. 10, 1953  G. A. WAHLMARK  2,658,456
FLUID DISPLACEMENT DEVICE
Filed July 29, 1948  10 Sheets-Sheet 7
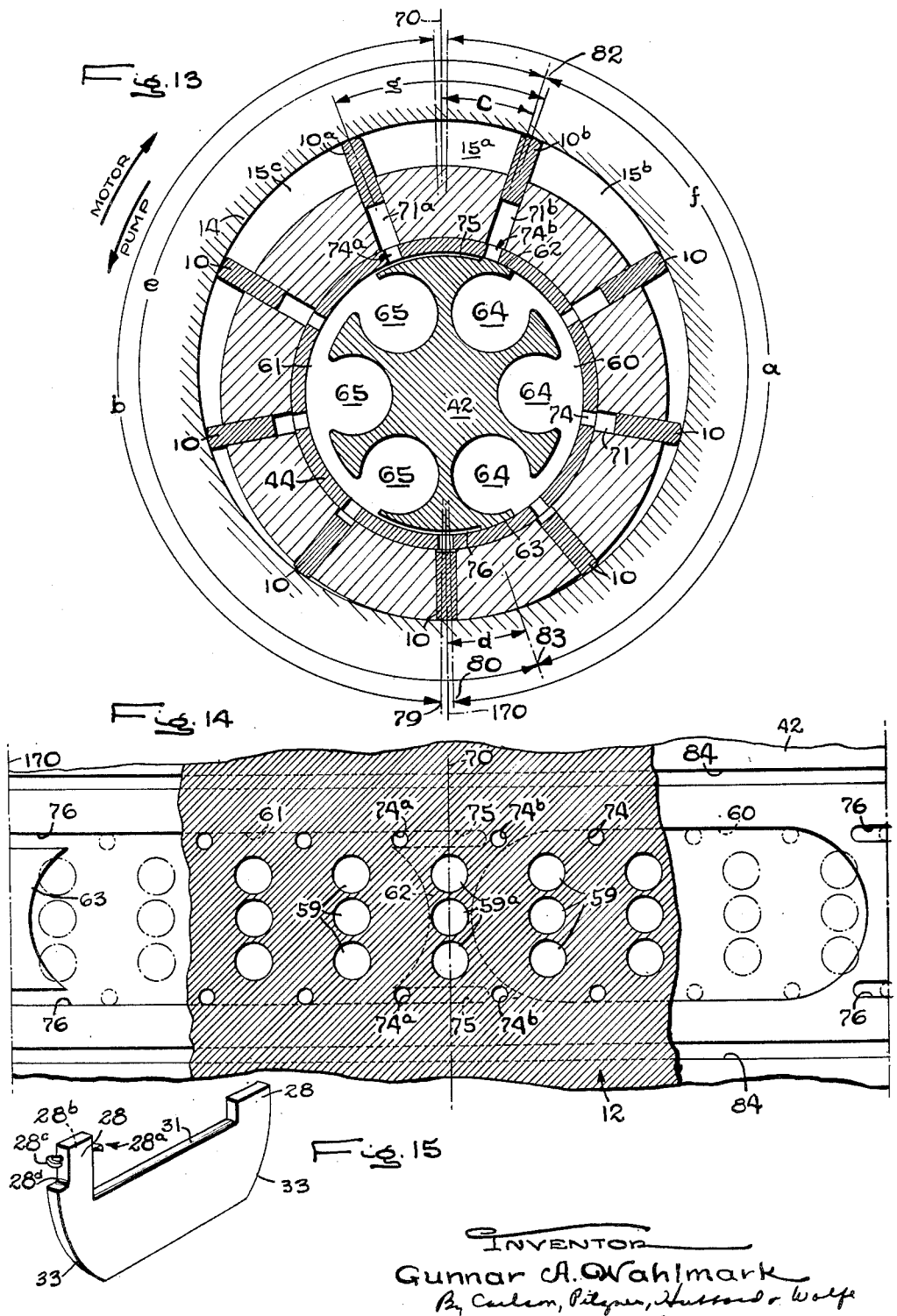
INVENTOR
Gunnar A. Wahlmark
ATTORNEY

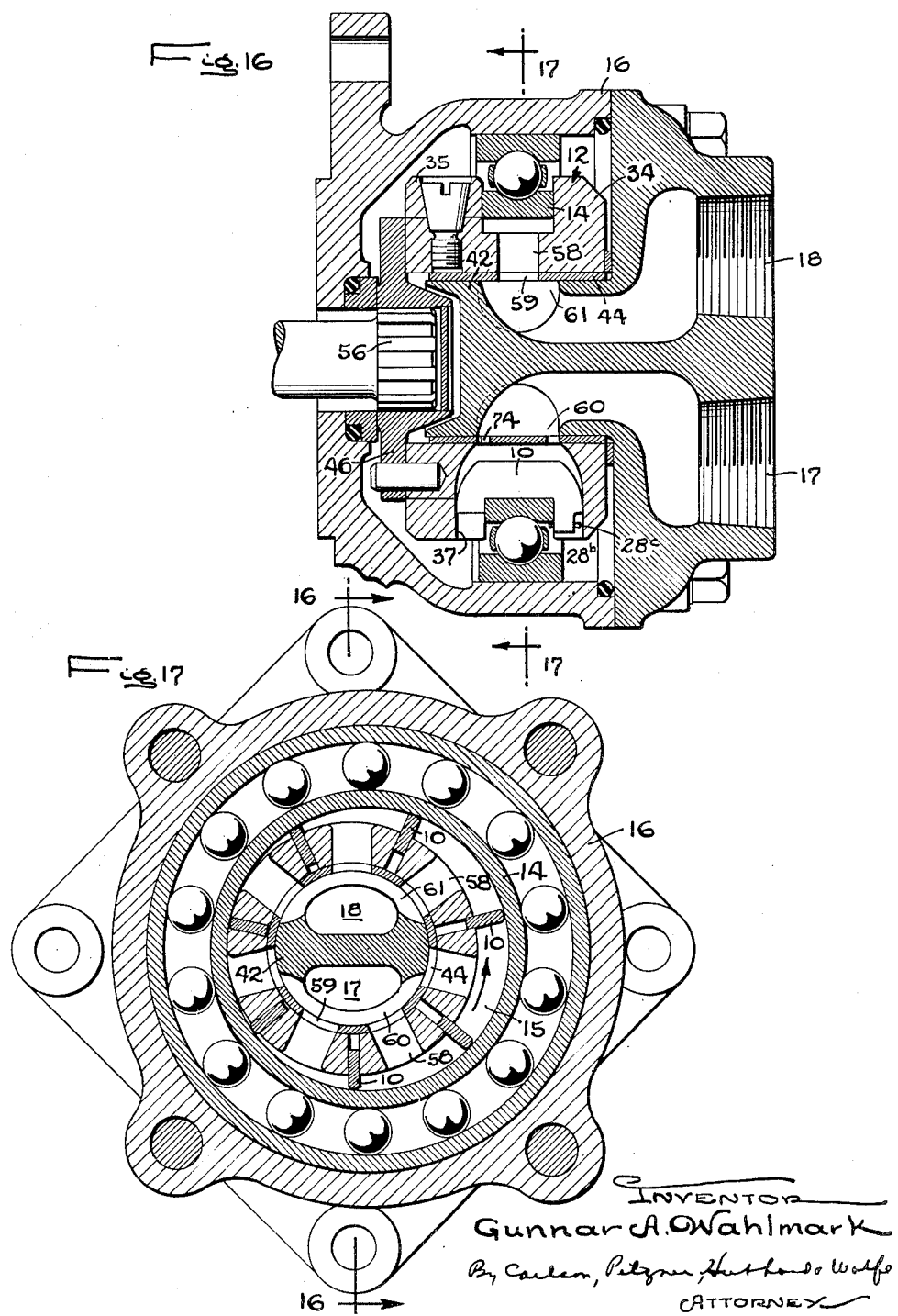

Nov. 10, 1953 G. A. WAHLMARK 2,658,456
FLUID DISPLACEMENT DEVICE
Filed July 29, 1948 10 Sheets-Sheet 9
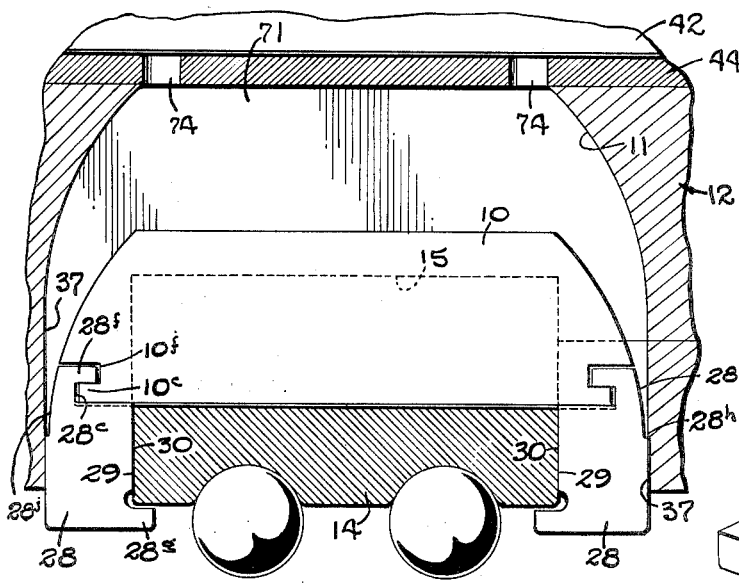
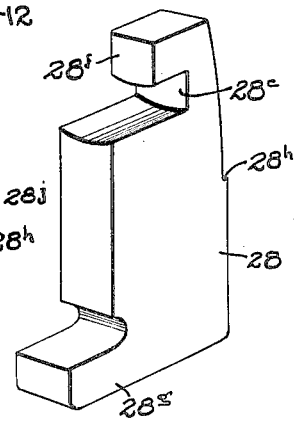
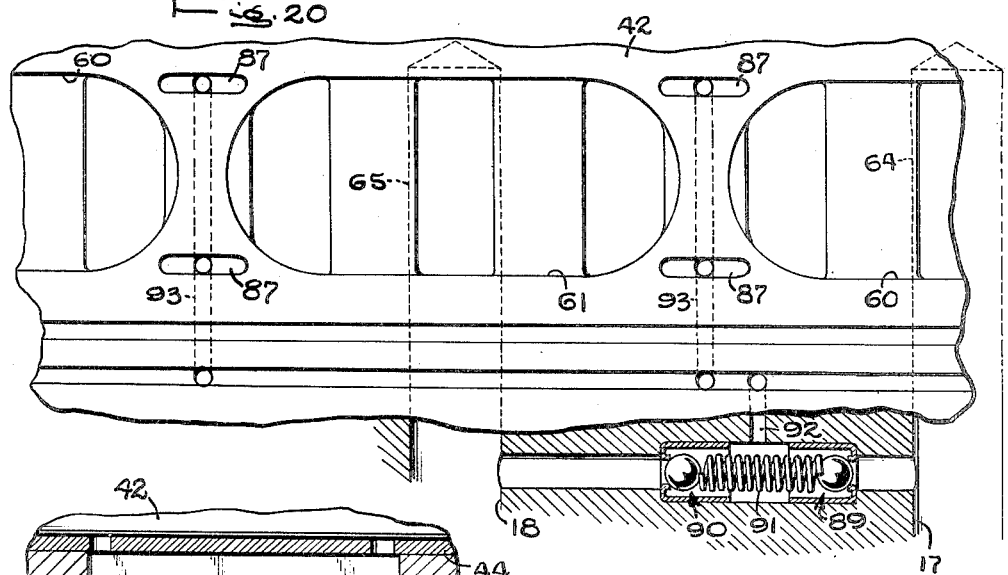
INVENTOR
Gunnar A. Wahlmark
By Carlsen, Pilzner, Hubbard & Wolfe
ATTORNEYS Nov. 10, 1953    G. A. WAHLMARK    2,658,456
FLUID DISPLACEMENT DEVICE
Filed July 29, 1948    10 Sheets—Sheet 10

INVENTOR
Gunnar A. Wahlmark
By Carlson, Pitzner, Hubbard & Wolfe
ATTORNEY

Patented Nov. 10, 1953

2,658,456

UNITED STATES PATENT OFFICE 2,658,456

FLUID DISPLACEMENT DEVICE

Gunnar A. Wahlmark, Rockford, Ill.

Application July 29, 1948, Serial No. 41,305

19 Claims. (Cl. 103—120)

This invention relates to fluid pumps and motors of the vane type in which rotatable vanes arranged in an annular series gear outwardly against an eccentric ring which rotates with the vanes.

The general object is to provide a displacement device of the above character which, as compared to prior vane type displacement devices, is cheaper to manufacture, smaller in size for a given capacity, capable of developing higher pressures, is usable as a fluid motor as well as a pump, and which, at the same time, is quiet and vibrationless in operation, is capable of withstanding high shock loads, and is well adapted to handle non-lubricating fluids.

Another object is to provide a vane type displacement device in which the high fluid pressure developed by the device when acting as a pump or delivered to the device when the latter is acting as a motor is utilized in a novel manner to seal the vanes effectually against the associated eccentric surface.

A further object is to employ a novel vane construction and mounting which provides differential areas to which high pressure fluid may be applied to produce a resultant sealing force of required magnitude.

Still another object is to apply the sealing pressure to each vane during only part of each revolution whereby to minimize frictional wear and loss of over-all efficiency.

Another object is to employ a hollow vane support or rotor and journal the latter on a nonrotatable stud which is also utilized as a valve for controlling the communication between the fluid displacement chambers and the inlet and outlet of the device.

A further object is to provide a vane type fluid displacement device in which the opposed pressures acting on the rotor are controlled and balanced against each other in a novel manner which minimizes bearing loads and contributes to the overall simplicity of the device.

The invention also resides in the novel manner of guiding the vanes to support the latter effectually against lateral bending.

Other objects and advantages of the invention will become apparent from the following detailed description taken in connection with the accompanying drawings, in which Figure 1 is a cross-sectional view of a fluid displacement device embodying the novel features of the present invention, the section being taken along the line 1—1 of Fig. 3.

Fig. 2 is a fragmentary perspective view of the actuator ring and part of the rotor.

Figs. 3 and 4 are longitudinal sections taken respectively along the lines 3—3 and 4—4 of Fig. 1.

Fig. 5 is an exploded perspective view.

Figs. 7 and 8 are cross-sectional and longitudinal sectional diagrammatic views illustrating the application of fluid pressures to the rotor.

Fig. 9 is an enlarged fragmentary view taken along the line 3—3 of Fig. 1 and illustrating the application of pressures to the different parts of one of the vanes.

Fig. 10 is a perspective view of one of the vanes.

Fig. 11 is a longitudinal sectional view taken along the line 11—11 of Fig. 12 showing a modified form of the displacement device.

Figs. 12 and 13 are cross sections taken respectively along the lines 12—12 and 13—13 of Fig. 11.

Fig. 14 is a development view of the porting in the displacement device shown in Figs. 11 to 13.

Fig. 15 is a perspective view of the vane used in the device shown in Figs. 11 to 13.

Fig. 16 is a longitudinal sectional view taken along the line 16—16 of Fig. 17 showing another modification.

Fig. 17 is a cross section taken along the line 17—17 of Fig. 16.

Fig. 18 is a fragmentary view similar to Fig. 9 showing a modified form of vane.

Fig. 19 is a perspective view of part of the vane shown in Fig. 18.

Fig. 20 is a development view similar to Fig. 14 showing the valve porting for a reversible displacement device.

Fig. 21 is a view similar to Fig. 18 showing another form of vane.

Figure 22:
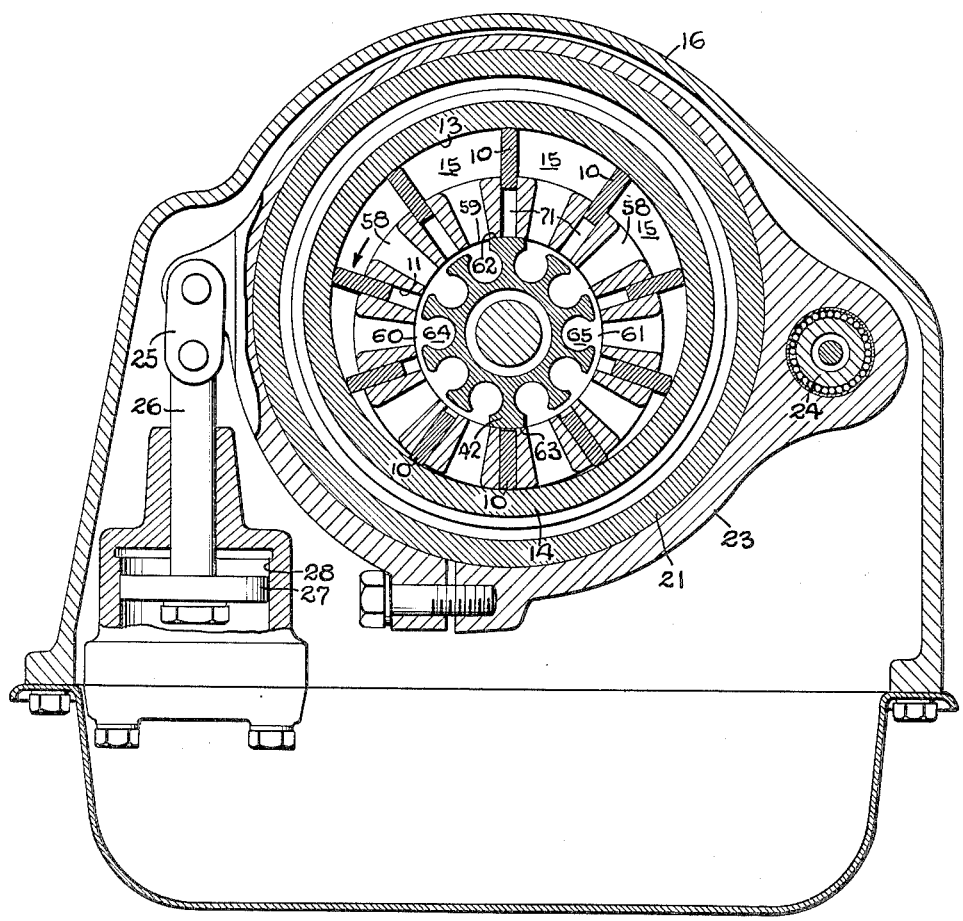

Fig. 22 is a view similar to Fig. 1 showing a reversible pump or motor.

For purposes of illustration, the drawings show the invention incorporated in a variable displacement variable pressure pump or motor (Figs. 1 to 10), a constant pressure variable displacement pump (Figs. 11 to 15), in a pump or motor of fixed capacity (Figs. 16 and 17), and in a reversible pump or motor (Figs. 20 and 22). In each instance, the displacement device comprises generally a series of vanes 10 supported by and slidable radially in slots 11 in a rotor 12 and bearing outwardly against the internal cylindrical surface 13 of a rotatable eccentric or actuator ring 14 which cooperates with the exterior of the rotor and each pair of adjacent vanes to form fluid chambers 15 which expand and contract in the volume progressively in successive half revolutions of the rotor. These moving parts are housed within and supported by a casing 16 which may include a fluid sump or be drained through an opening 16ª (Fig. 11). The casing has openings 17 and 18 in one end which openings constitute the inlet and outlet respectively when the device is used as a unidirectional pump and the outlet and inlet respectively when the device is used as a motor. In either case the fluid in the recess 18 and the passages connected thereto is under high pressure while the recess 17 is at low pressure.

The actuator ring 14 is mounted to turn with the rotor so as to minimize rubbing between the ring and the vane ends. To this end, the ring is supported by antifriction bearings such as balls 19 rolling in a raceway 20 formed around the exterior of the ring 14 and a second raceway around the interior of an outer race ring 21.

In a displacement device of fixed capacity (Figs. 16 and 17), the outer ring 21 is secured rigidly to the interior of the peripheral wall of the casing 16 and offset with the desired eccentricity with respect to the rotor axis. If the fluid displacement of the device is to be variable, the ring 21 is supported in the casing 16 to shift transaxially. This may be accomplished as shown in Figs. 1 to 5 by mounting the outer race ring 21 in a supporting annulus 23, one side of which is pivoted on a pin 24 fixed in the casing 16 and extending parallel to the rotor axis. The other side of the annulus may be connected as through links 25 to a power actuator such as a hydraulic servo comprising a rod 26 on a piston 27 which is slidable in a cylinder 28 (see Fig. 1). By regulating the admission of pressure fluid to opposite ends of the cylinder, the rings 14, 21, and 23 may be shifted about the pivot 24 and laterally of the rotor axis to vary the eccentricity of the actuator ring 14 and therefore the displacement capacity of the device. The ring 14 may, as shown in Fig. 22, be mounted to shift across the rotor axis thereby reversing its eccentricity and correspondingly reversing the direction of fluid flow within the device.

In the constant pressure pump shown in Figs. 11 to 14, the outer bearing ring 21 is guided by bearings 38 and 39 on opposite sides of the housing 16 for rectilinear transaxial movement to vary the throw of the eccentric and therefore the amount of fluid displaced per revolution of the rotor. To control the latter and produce a constant outlet pressure, the ring 14 is urged in one direction by a spring 40 and in the opposite direction by a hydraulic actuator 41 energized in accordance with pressure changes in the pump outlet.

The number of vanes employed may be varied as desired and will usually be determined by the characteristics required to meet given operating conditions. Pumps and motors with eight and ten vanes are shown herein but for other applications a larger number, for example, fifteen may be used in order to provide a more continuous flow of fluid in the case of a pump or torque in the case of a fluid motor.

The vanes 10 (see Figs. 9, 10 and 15) comprise flat hardened steel plates of uniform thickness and, in accordance with one aspect of the present invention, are made substantially wider than the actuator ring 14 and are formed, preferably at opposite sides, with legs 28 which project outwardly and straddle the parallel ends 29 of the ring with which the inner surfaces 30 of the legs 28 have a close running fit. The outer ends 31 of the vanes are rounded in cross section and machined accurately to fit against the cylindrical inner surface 13 of the actuator ring and contact the latter along a line which shifts back and forth transversely of the vane as the plane of the vane shifts through a small angle back and forth across the axis of the ring 14 in each revolution of the rotor. The inner ends of the vanes may be squared as shown in Figs. 3, 5, 9 and 10 with parallel outer side edges 32.

In order, however, to facilitate the formations of the blade slots as by milling operations, it is preferred to round off the inner corners as indicated at 33 in Figs. 11 to 15 thereby shortening substantially the radial length of the vane edges 32. It is desirable to construct one of the legs 28 in a manner such as to facilitate assembly of the rotor after insertion of the vanes 10 in the slots 11. This may be accomplished as shown in Figs. 11 to 15 by making one of the legs 28 relatively short but nevertheless long enough to overlap the ring 14 in all of its normal operating positions. The other leg 28 is made somewhat longer and equipped with means for limiting the inward movement of the vane when the latter is not under outward pressure. This means may comprise a key 28$^a$ projecting through a crosshole 28$^b$ in the leg with one enlarged end 28$^c$ disposed in a notch 28$^d$ and its other enlarged end overlapping the exterior of the actuator ring.

The rotor 12 by which the blades are supported and guided in their radial movement comprises a spool substantially longer than the width of the vanes and formed at opposite ends with two outwardly projecting flanges 34 and 35, the inner parallel faces of which straddle the actuator ring 14 and have a close running fit with opposite sides 29 thereof. The flange 34 is preferably made integral with the rotor while the flange 35 is a separate part machined to fit over or against the end of the rotor to which it is locked securedly by a plurality of set screws 36. The radial slots 11 in which the vanes 10 fit closely are spaced uniformly around the rotor and, in the form shown in Figs. 1 to 9, are milled entirely through the rotor and extend throughout the full length of the rotor core and axially into each of the rotor flanges 34 and 35. The length of the slots corresponds to the over-all width of the vanes so that the sides 32 of the vanes fit closely against the ends 37 of the slots.

With the arrangement thus described, it will be seen that the defining side walls of the slots overlap not only the inner end portions of the vanes as in ordinary vane pumps but also both side portions including the projections 28 so that even when a vane is in its outermost position, it is engaged by the guide surfaces along three of its four margins and over the U-shaped area shaded in Fig. 10. As a result, no portion of the vane is left overhanging its guides and the vane is therefore held firmly against bending under the substantial pressure which is applied to only one face of the vane in part of each revolution. Free sliding of the vane in its guides is thus assured under all conditions thereby adapting the displacement device for operation at fluid pressures substantially higher than has been possible in prior vane type pumps and motors. Such side guiding also enables the length of the vanes to be reduced to a minimum and optimum displacement capacity to be achieved for a given over-all size of the device.

To facilitate counterbalancing of the pressure forces on the rotor in the manner to be described later, the rotor is journaled on a hardened external surface of a cylinder or stud 42 rigid with the casing 16 and projecting axially through an axial bore 43 of the rotor which may be formed in part by bearing bushings 48 if desired (Figs. 3 and 4). In the embodiments shown in Figs. 11, 12, 16 and 17, the bearing surface 43 is on a bushing 44 pressed into the core of the rotor spool and fastened rigidly in the latter. The stud 42 may be a separate part fixed to an internal hub of the casing 16 as by a screw 45 (Fig. 11) or, it may be formed integral with the casing (see Figs. 16 and 17) and surface hardened after machining.

Rotary power is transmitted to the rotor through drive member 46 which, in the embodiment shown in Figs. 1 to 4, comprises a shaft journaled in a bearing 47 in the outer end of the casing 16 and extends axially through a hole 42ª in the bearing stud 42. Beyond the latter, the drive shaft has a spline connection 49 with a tube 50 which is received in the inner end of the rotor 12 and is secured to the latter as by screws 51. In the form shown in Figs. 11 and 12, the drive member 46 has a flange 52 pinned at 53 to the end of the rotor and abutting against a thrust bearing 54 which is seated in the hub of the casing and oil sealed by a ring 55. The drive member is splined externally (Figs. 11 and 12) or internally (Figs. 16 and 17) as indicated at 56 and thus adapted to be coupled to an external source of rotary power.

Valve means, preferably formed from the engaging surfaces of the bearing stud 42 and the rotor 12 are utilized to connect each chamber 15 alternately to the low and high pressure recesses 17 and 18 during successive half revolutions of the rotor when the chamber is expanding and contracting owing to the eccentricity of the rotor and the actuator ring 14. The fluid connections from the respective chambers 15 extend inwardly through radial passages 58 terminating at their inner ends in ports 59 which preferably are spaced equidistant from the two adjacent vanes 10. In the embodiments shown in Figs. 11 to 17, these ports comprise holes drilled through the bushing 44.

Cooperating with the ports 59 are two arcuate grooves 60 and 61 formed in the exterior of the bearing cylinder 42 on diametrically opposite sides thereof and angularly spaced apart at their adjacent ends to provide sealing lands 62 and 63, the circumferential length of which is only slightly greater, preferably about two degrees, than the circumferential width of the rotor ports 59. The groove or port 60 communicates with the inlet or low pressure recess 17 through one or more passages 64 extending axially along the stud 42. The arcuate port 61, including its tapered extensions 61ª (Figs. 1 to 5) is similarly connected to the outlet 18 through one or more passages 65.

The connections are direct where the inlet and outlet are in a stationary part (Figs. 11 and 17). For installations as shown in Figs. 3 and 4 in which the inlet 17 and the outlet 18 turn with the rotor 12, the passages 64 and 65 in the stud 42 lead to the inlet and outlet respectively through transfer rings 66 and 67 and associated passages 68 and 69.

The lands 62 and 63 between the valve grooves 60 and 61 are substantially centered with respect to a diameter through the dead-center positions 70 and 170 of the rotor which coincides with the line of eccentricity of the rotor 12 and actuator ring 14. Thus, each port 59 is closed by one land and the associated chamber 15 is disconnected from both the low and high pressure grooves 60 and 61 for about two degrees of rotation when the port 59 is passing each dead-center position. That is to say, the chamber is connected to the low and high pressure grooves for 178 degrees (indicated at a and b, Fig. 13) in successive half revolutions of the rotor.

The connection of each chamber 15 to the inlet and outlet recesses thus coincides with the expansion and contraction of the chamber by the action of the eccentric 14 and the duration of the sealing off of the chamber in passing over each land 62 and 63 and dead center 70 is so short that there is no objectionable trapping of oil within the chamber.

In accordance with another aspect of the invention, the higher fluid pressure available within the displacement device is utilized in a novel manner to produce a resultant force acting outwardly on each vane to hold the latter into firm sealing engagement with the actuator ring 14 during at least that portion of the rotor revolution when the vane is active. To accomplish this, fluid from the high pressure recess 18, that is, the outlet in the case of a pump and the inlet in the case of the motor, is admitted to the inner end portions 71 of the vane slots 11 and in addition the vanes are constructed and mounted in the rotor to provide inwardly facing pressure areas which are substantially larger than the outwardly facing areas on the outer ends 31 of the vanes which latter areas are also exposed to the same fluid pressure. The difference in the effective areas of the vane ends is achieved by above described and as illustrated in Fig. 9 by making the vanes wider than the actuator ring 14, forming each vane with the outwardly projecting legs 28, and exposing the end areas 72 of these legs to a lower pressure which, in this instance, is the atmosphere. It follows, therefore, that each vane, when the pocket 71 beneath it is subjected to the high fluid pressure, will be urged outwardly with a force equal to the difference between such pressure and the atmosphere multiplied by the combined areas of the ends 72 of the vane legs 28. These parts are proportioned so that the outwardly directed sealing force will under all conditions, including starting of the displacement device when acting as a fluid motor, produce an effective seal between the outer end 31 of the vane and the actuator ring surface 13. Centrifugal force, although acting on the vanes after starting of the rotor, adds to this sealing force but cannot be relied upon to initiate operation of the device as a fluid motor.

With the main valving mechanism including the ports 59, 61 arranged within the rotor as described above, the sealing pressure may be applied to the vane pockets 71 by a very simple porting arrangement. Thus, it is only necessary to provide ports 74 on the inner surface of the rotor communicating with the vane pockets 71 and positioned to register with the valve groove 61 and appropriate extensions thereof. In the form shown in Figs. 1 to 9, the ports 74 are formed simply by extending the vane slots 11 inwardly into the rotor bore 43. Where a bearing bushing 44 is used to define the rotor bore, holes 74 are drilled therethrough into the vane slots and spaced to register with the outer margins of the grooves 60 and 61 but are disposed outwardly beyond the ports 59 leading to the chambers 15. With this arrangement, each vane pocket 71 is connected to the groove 61 (Figs. 5 and 6) and therefore to the high pressure recess 18 for substantially a half revolution of the rotor rotation. Also, while the port 74 is in register with the low pressure groove 60 during its next half revolution, the volume of the vane pocket 71 will be decreased and the outward sealing force on the vane is reduced to a value corresponding to the pressure in the low pressure recess 17.

In order to impart optimum displacement capacity to the device, the invention contemplates admission of high pressure fluid to each vane pocket 71 over an arc substantially greater than a half revolution and overlapping both ends of the high pressure groove 61 so that the high sealing pressure is exerted on each pair of adjacent vanes throughout the entire half revolution (arc b, Fig. 13) when the chamber 15 between these vanes is under high pressure. This necessitates the admission of the high pressure fluid to the pocket 71 of each vane for more than a half revolution (arc e, Fig. 13) by an amount corresponding approximately to the angular spacing of vanes and preferably divided into two equal parts c and d overlapping opposite ends of the arc b. At the same time, the arc f during which vane pockets 71 are connected to the low pressure groove 61 is correspondingly shortened to less than a half revolution.

Figure 6:
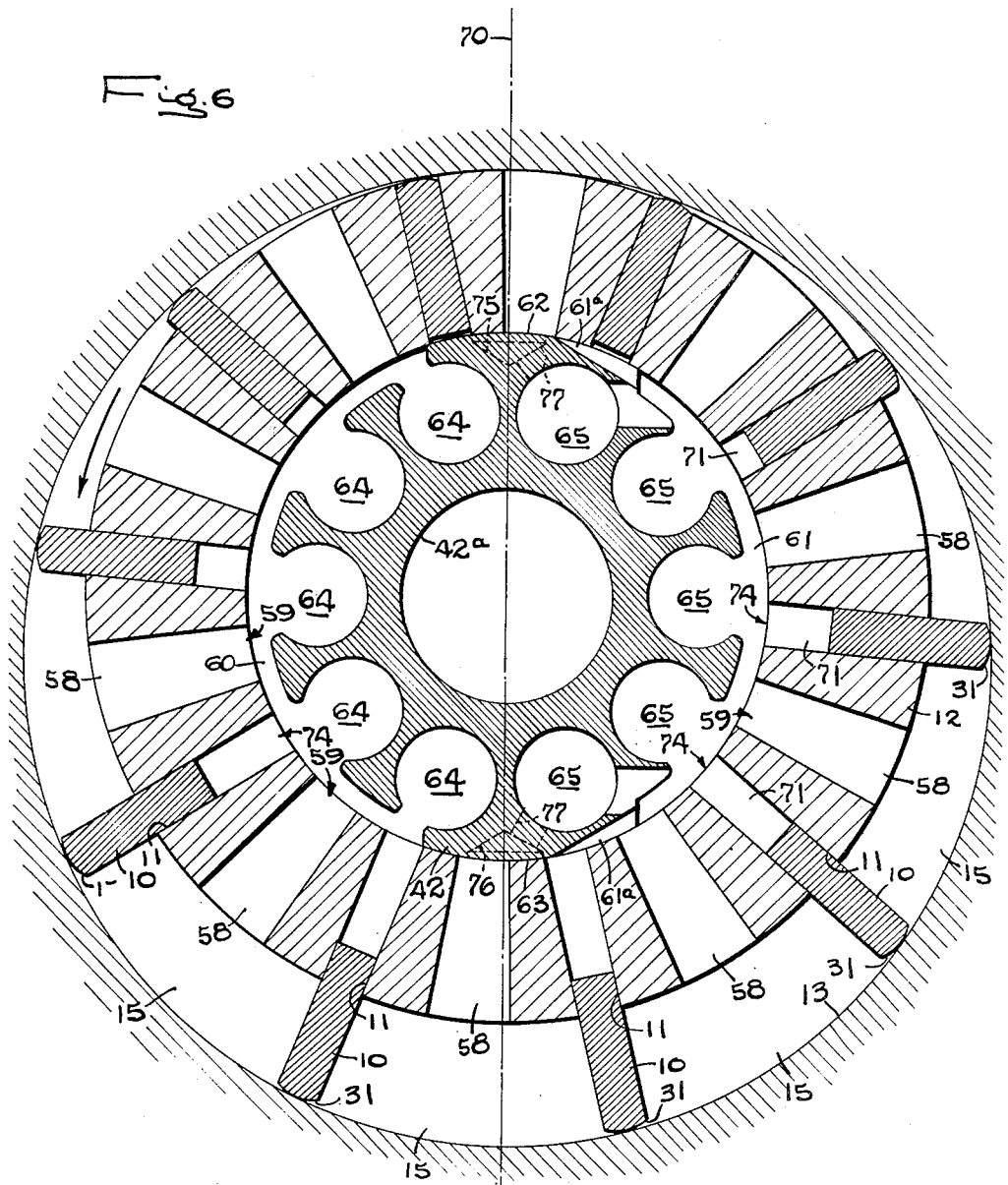
Fig. 6 is an enlarged cross-sectional view similar to Fig. 1.

The foregoing ends are achieved by providing ports 75 and 76 in the outer surface of the valve cylinder or stud 42 and connecting these ports to opposite ends of the groove 61 and located to produce the timing above described. In Figs. 5 and 6, the ports 75 and 76 are in the form of holes drilled into the periphery of the cylinder 42 and connected by cross-passages 77 to the adjacent passages 65 leading to the high pressure recess 18. In the form shown in Figs. 11 to 14, the ports 75 and 76 comprise parallel slots of the proper circumferential length cut in the periphery of the cylinder 42.

With this arrangement, it will be observed that the ports 59, 60 and 61 form valves controlling the flow of fluid to and from the chambers 15 in timed relation to the expansion and contraction thereof and that the ports 60, 61, 74, 75 and 76 control the admission of high pressure fluid to the vane pockets with similar timing. Referring to Figs. 12, 13 and 14 and assuming that the rotor and the ports 59 and 74 are turning counterclockwise as indicated by the arrows, the ports 59ᵃ leading to the chamber 15ᵃ will be closed by the land 62 and the chamber will be centered relative to the dead-center position 70 and thus fully expanded. At this time, the ports 74ᵃ corresponding to the vane 10ᵃ which forms the leading wall of this chamber will be disposed beyond dead center and in register with the slots 75 so that high pressure fluid will be admitted beneath the vane to seal the latter against the ring 14. At the same time, the port 74ᵇ of the vane 10ᵇ defining the trailing wall of the chamber 15ᵃ will be disposed short of dead center and the slots so as to be covered by the land 62, the application of sealing pressure to the vane 10ᵇ thus being discontinued.

As the chamber 15ᵃ starts to contract by moving past dead center 70, the ports 59 immediately (after about one degree) encounter the groove 61 and thus become connected to the high pressure recess 18. Substantially simultaneously the ports 74ᵇ of the vane 10ᵇ which forms the trailing wall of the chamber 15ᵃ comes into registry with the extensions 75 of the high pressure groove 61 whereupon fluid under high pressure enters the pocket 71ᵇ beneath the vane 10ᵇ and the latter is sealed against the ring 14. This sealed condition of the vanes 10ᵃ and 10ᵇ obtains throughout the next half revolution of the rotor during which the chamber 15ᵃ contracts progressively and fluid therein is forced out through the passage 58 and the groove 61 to the outlet 18. During most of this half revolution, the vane ports 74ᵃ and 74ᵇ register with the groove 61 and the vanes 10ᵃ and 10ᵇ are held outwardly under the high fluid pressure. When the chamber 15ᵃ reaches the other dead-center position 170, its ports will pass onto the valve land 63 thereby closing the chamber momentarily, that is, for about two degrees including the dead-center position. Simultaneously, the vane ports 74ᵃ which have then moved well beyond dead center, pass out of registry with the extensions 76 of the groove 61 and onto the land 63 thereby interrupting the flow of high pressure sealing fluid to the vanes 10ᵃ.

Now as the ports 59ᵃ pass off from the land 63 and onto the groove 60 and the chamber 15ᵃ starts to expand and draw fluid from the inlet 17, the vane ports 74ᵃ also come at substantially the same time into register with the groove 60 thereby releasing the sealing pressure on the vane 10ᵃ. The vane 10ᵇ which then forms the leading wall of the next chamber 15, remains sealed until it passes over dead center to a corresponding position.

From the foregoing, it will be apparent that each chamber 15 becomes connected to the high pressure valve groove 61 at 78 (Fig. 13) slightly beyond the dead center 70 and remains so connected while contracting for nearly a half revolution (arc b) to the point 79. Then, after passing the dead-center position 170 the chamber becomes connected at point 80 to the low pressure groove 60 to which the chamber remains connected for the next 178 degrees until it reaches the point 81 just short of dead center 70.

The vane pocket 71 on the other hand is connected to the high and low pressure sources of fluid through arcs e and f of different lengths because the vanes are spaced angularly from the centers of the chambers. With the arrangement described above, the connection of each vane pocket 71 with the high pressure source of fluid starts short of dead center 70 at the point 82 and continues for 216 degrees past both dead-center positions to the point 83. The vane pockets are under low pressure for an arc of about 144 degrees between the points 83 and 82.

The use of the high fluid pressure in the manner described above to seal vanes outwardly against the ring 14 enables the displacement device to be used as a fluid motor and to exert a substantially continuous torque on the output shaft 46. Such operation occurs when fluid under pressure is admitted to the recess 18 causing clockwise turning of the rotor as a result of high pressure on the trailing side and low pressure on the leading side of each vane as the latter moves through an arc g (Fig. 13) across dead center.

Considering the operation of the device as a motor starting with the parts positioned as shown in Figs. 13 and 14, the chamber 15ᵇ will be connected to the groove 60, and, therefore, at low pressure, the chamber 15ᶜ will be connected to the groove 61 and, therefore, at high pressure, while the land 62 covers the ports 59ᵃ and closes the chamber 15ᵃ which is precisely on dead center. The pocket 74ᵇ for the vane 10ᵇ is similarly closed and high pressure fluid is admitted through the slot 75 and the port 74ᵃ to the pocket 71ᵃ so that the vane 10ᵃ is forced outwardly into sealing engagement with the ring 14.

Under these conditions, torque will be exerted on the rotor by virtue of the high pressure within the chamber 15ᶜ exerted on the trailing face of the vane 10ᵃ and the low pressure on the leading face of the vane 10ᵇ and existing in the chamber 15ᵇ. After about one degree of further turning of the rotor, the vane pocket 10ᵇ and the chamber 15ᵃ become connected to the low pressure source whereupon the driving torque is due to high and low fluid pressures on the trailing and leading sides of the vane 10ᵃ. The latter remains sealed against the actuator ring as the vane moves past dead center and reaches the position 82 at which the vane pocket 71ª and the chamber 15ᶜ become disconnected from the high pressure source.

It will thus be seen that the vanes on both sides of each chamber 15 are urged outwardly by high pressure fluid as chamber approaches dead center, the sealing being continued until the chamber reaches dead center. As a result, there is in all positions of the rotor always one vane or two adjacent vanes which are exposed on the trailing side to high pressure while the leading side is at low pressure. The pressure difference acts on full area of the trailing vane to produce the motor torque which is exerted continuously by virtue of the valving action described above. This condition exists at each and every angular position of the rotor and, therefore, rotation of the latter will always be initiated when fluid under pressure is admitted to the recess 18. Therefore, since the device does not rely on centrifugal force to seal the vanes, it is usable as a fluid motor as well as a pump.

At the same time, the porting arrangement effectually prevents trapping of fluid beneath any vane while the latter is approaching the dead center 170 and is moving inwardly. This is because each port 74 leading to a vane pocket 71 is not closed by the land 62 until the chamber 15 trailing such vane has been reduced to low pressure and the vane has passed beyond this dead-center position and is moving outwardly. Trapping of oil that might result in noisy operation of the device is also avoided in the case of the chambers 15. Each of these is closed by lands 62 and 63 for only about one degree of the rotor revolution while the chamber is being contracted by the eccentric action. At this time, the chamber is approaching or leaving dead center so that the decrease in volume is negligible.

While in the displacement device described above the actuator ring 14 rotates in unison with the rotor 12 owing to journaling of the ring in the antifriction bearings 19, there is nevertheless a small relative angular displacement and rubbing between the ring surface 13 and the outer ends 31 of the vanes due to offsetting of the ring and rotor axes. Wearing of the parts due to such rubbing of the two together is minimized with the pressure sealing arrangement above described in which the sealing force is applied to a vane only during that portion of the revolution when the vane is active, that is, in the arc e (Fig. 13). During the remaining part (arc f) of the revolution, the vane pocket 71 is connected to a lower pressure space 61 and the application of the sealing pressure to the vane is discontinued thereby reducing wear correspondingly.

Application of the sealing pressure to the vanes during their inward strokes only is further advantageous in avoiding a reduction in volume of fluid delivered when the device is being used as a pump. This is for the reason that the outward displacement of the vanes equals approximately one-tenth of the total pump displacement resulting from contraction of the chambers 15. Therefore, by disconnecting each vane pocket 71 from the outlet 18 of the pump during most of the outward stroke of the vane, no high pressure fluid is withdrawn from the outlet of the pump. Maximum output of the latter is thus achieved.

The possibility of noise due to a sudden surge of fluid under high pressure through the ports 59 into the chambers 15 is minimized in the present instance by increasing the area of the registration of each port and the groove 61 progressively from zero to a maximum. This is accomplished through the use of the tapered extensions 61ª of the groove 61 (Figs. 1 to 6) and by rounding the ends of the groove 61 in Figs. 11 to 14.

As pointed out above, the displacement device may be rendered reversible by providing for transaxial adjustment of the actuator ring 14 across the rotor axis as shown in Fig. 22 thereby reversing the throw of the eccentric surface 13. When this is done, the valve groove 60 becomes the high pressure area while the groove 61 will be at low pressure. To admit high pressure fluid to the vane pockets 71 and seal the vanes 10 beyond a half revolution and over the desired arc c (Figs. 15 and 22), the extensions 75 and 76 of the rotor ports 60 and 61 are omitted and separate slots 87 and 88 (Fig. 20) formed in the exterior of the cylinder 42 are substituted and located in positions to register with the rotor ports 74 with their opposite ends stopped just short of the grooves 60 and 61.

Provision is then made for connecting these slots 87 and 88 with the one of the recesses 17 or 18 which is at high pressure as determined by the direction of throw of the eccentric ring 14. This may be accomplished automatically by check valves 89 and 90 loaded by a spring 91 and formed in or mounted on the housing 16 with their inlet sides connected to the recesses 17 and 18 respectively. The common outlet 92 from the valves leads through the stud 42 and passages 93 to the valve slots 87 and 88 which passages may be formed by drilling the stud 42 longitudinally and crosswise. Thus, when the ring 14 is positioned on the side of the rotor axis as shown in Figs. 11 to 15, the recess 17 and the valve groove 60 will be at high pressure if the device is operated as a motor and high pressure fluid will be forced through the check valve 89 to the slots 87 and 88. Now, if the ring is shifted across the rotor axis, the recess 18 will be at high pressure and the slots 87 and 88 will be supplied with high pressure sealing fluid through the check valve 90. If desired, the passage 92 may be reduced in cross section to such an extent as to restrict the free flow of high pressure fluid to the slots 87 thereby preventing pressure in the latter from attaining the full working value which exists in the high pressure recess 18. In this way, the sealing pressure in the vane pockets 71 may be adjusted to any desired value.

By constructing and arranging the rotor and the associated valve mechanism in the manner described above, it is possible to balance the forces acting on the rotor against each other and reduce the resultant transaxial force or bearing load to such a value as to permit mounting of the rotor on a simple plain bearing which may be formed on an overhanging projection such as the stud 42, and this, in spite of operation of the displacement device at very high pressures. Referring to Figs. 7 and 8, it will be apparent that the high pressure fluid within the chambers 15 at any time acts over an area whose width ($x$ in Fig. 8) is determined by the spacing of the flanges 34 and 35 and whose length $y$ is equal to the external diameter of the rotor plus the length of the projecting portion of one vane. This pressure which is indicated by the inwardly pointing arrows in Fig. 7 is opposed by fluid pressure of the same magnitude directed outwardly and acting on that portion of the inner surface 43 of the rotor which is exposed by the outlet passage or groove 61. This latter area, as indicated by the outwardly pointing arrows (Fig. 7) and the double shading in Fig. 8, is substantially smaller than the first mentioned area so that high pressure applied to differential areas $s$ alone would result in heavy loading of the rotor bearing.

To overcome this, the external bearing surface of the stud 42 is made cylindrical and of the same diameter as the intervening surface of the lands 62 and 63 so that with the bearing clearance normally provided between the two bearing surfaces, high pressure fluid from the groove 61 is admitted between these surfaces thereby extending the effective exposed rotor surface. The high fluid pressure acts outwardly on these additional inwardly facing areas indicated at $z$ (Fig. 8) to counteract partially the pressure on the areas $s$. Of course, the pressure within the bearing surfaces decreases progressively and does not, with the clearances ordinarily used, approach or overbalance the total pressure on the areas $s$. A resultant inwardly directed force remains and acts on the rotor to urge it transaxially and maintain the desired seal between the rotor and stud surfaces around the high pressure valve groove 61. However, the reduction in the magnitude of this force due to the added areas $z$ is sufficient to permit mounting of the rotor on plain bearings which contribute to the reduced size and cost of the displacement device.

Under certain conditions, it may be desirable to limit the size of the added areas $z$ and therefore control the counterbalance force resulting. This may be accomplished by providing peripheral grooves 84 at low fluid pressure around the stud 42 as shown in Fig. 11 and spacing these grooves away from the exposed part of the rotor surface 43 according to the size of the areas $z$ that may be desired. Because the rotor is, as described above, shifted transaxially by the high pressure acting on the areas $s$, the clearance between the bearing surfaces on the low pressure side of the rotor will be increased thereby providing the necessary fluid connection between the grooves 84 and the low pressure port 60. If desired, separate channels may be provided to effect this connection.

Several manufacturing and functional advantages may be achieved by constructing the vanes 10 as shown in Figs. 18 and 19 with one or both of the legs 28 formed as separate parts detachable from the vane proper. These parts comprise metal blocks each machined with parallel sides adapted to fit closely between the end wall 37 of the rotor slot 11 and the opposed end of the ring 14 which is engaged by the surface 30 of the block. A notch 28ᶜ near the inner end and on the inner side of the block loosely receives an outwardly projecting lug 10ᶜ formed on the outer end of the vane and an inwardly projecting lug 28ᶠ on the block fits loosely in a notch 10ᶠ in the vane. A double tongue and groove connection is thus formed which permits the two parts to be joined by a broadwise movement relative to each other while the notches and lugs are in register after assembly of the ring flange 35 on the rotor and while the vane is held outwardly. Inward movement of the assembled vane is limited by lugs 28ᵍ on the legs 28 projecting inwardly and overlying the exterior of the actuator ring 14. Preferably, a squared notch 28ʰ is formed in the outer side of the block at the inner end therefor to prevent any foreign particles in the pumped fluid from becoming wedged between the leg 28 and the end wall 37 of the vane slot 11. This also provides an outwardly facing effective pressure area 28ʲ exposed to the pressure fluid in the vane pocket 71 and acted on by the latter to urge the legs 28 inwardly relative to the body of the vane proper and against the ends 29 of the actuator ring 14 thereby taking up all clearance at this point so as to seal the chambers 15 more effectually. That is to say, because the looseness in the connections between the legs 28 and the vane proper permits some degree of edgewise shifting of the legs, the high fluid pressure beneath and around the sides of the vanes is utilized to seal the vanes not only outwardly against the internal surface 13 of the ring 14 but also laterally against both ends 29 of the ring. Fluid leakage from the chambers 15 is thus minimized and operation of the device at high pressures is made possible. For the same reason, the necessity of precision spacing of the vane leg surfaces 30 is avoided and machining of the vane end 31 to the desired rounded contour throughout its length is facilitated. Although the legs 28 are disconnected from the body of the vane proper, effective lateral supporting of the vane along both sides and the inner end thereof is preserved along with the other functional advantages previously referred to.

The required differential pressure areas on the vanes 10 may, if desired, be produced by employing only one outwardly projecting leg 28 on the vane located intermediate the sides of the latter as shown in Fig. 21. In this case, the actuator ring or eccentric 14 is divided into two parts axially separated to receive the squared leg 28 which preferably projects outwardly from the vane body midway between the ends of the outer end surface 31 of the vane.

In addition to being usable either as a pump or as a fluid motor, the displacement device above described possesses numerous advantages, including low manufacturing cost, small size for a given capacity, durability in service use, and ability to operate quietly and without vibration at high pressures. Simplicity of construction and minimum dimensions are achieved by mounting the rotor on a plain bearing provided by the stud 42, by the side guiding of the vanes 10, and the formation of the valve ports in the coacting surfaces of the rotor and its bearing. By utilizing the available high pressure fluid for sealing the vanes, a minimum pressure is applied and this is relieved during that part of the revolution when the vane is inactive. This is to be contrasted with prior arrangements in which springs acting on the individual vanes or centrifugal force derived by turning of the rotor at high speed are relied on to seal the vanes. With springs, the sealing force is applied throughout each revolution over half of which it must be excessive in order to insure a proper seal when the vane is projected outwardly. Centrifugally sealed vanes cannot be used in a fluid motor in which sealing of the vanes is necessary in order to start the rotor when fluid pressure is supplied. The effective hydraulic sealing of the vanes and the novel porting to prevent fluid trapping either in the vane pockets 71 or the chambers 15 contribute to the high pressures under which the device may operate as well as its quiet and vibrationless operation.

I claim as my invention:

1. A fluid displacement device having, in combination, a rotor in the form of a spool having end flanges, a stud projecting into one end of the spool core and rotatably supporting the latter, an actuator ring encircling said spool and disposed between and having a running fit with the spool flanges, means supporting said ring to turn about an axis offset from said rotor axis, said rotor having angularly spaced slots extending radially through the rotor core and said flanges with the ends of said slots disposed in said flanges and parallel to each other on opposite sides of said ring, a plurality of vanes each disposed in one of said slots and guided by the side and end walls thereof, each vane having outwardly projecting legs straddling said ring and having a running fit therewith, said ring, said rotor and each pair of adjacent vanes defining a fluid chamber which expands and contracts alternately in successive half revolutions of said rotor, fluid inlet and outlet recesses formed within said stud, cooperating valve ports opening outwardly from said stud and inwardly from said rotor and operable to connect each of said chambers first to one of said recesses and then to the other in each revolution of the rotor, and valve means responsive to turning of said rotor and operable to connect the inner end of each of said vane slots first to one of said recesses and then to the other to seal the adjacent vanes against said ring while the intervening chamber is under high pressure, said vane legs being exposed at their outer ends to atmospheric pressure whereby the high pressure acting on the larger area inner end and the outer smaller end area produces a resultant force holding the vane outwardly against said ring.

2. A fluid displacement device having, in combination, a rotatably mounted rotor having end flanges, an actuator ring encircling said rotor and disposed between and having a running fit with said flanges, means supporting said ring to turn about an axis offset from said rotor axis, said rotor having outwardly opening slots angularly spaced around its periphery with parallel end walls disposed outwardly beyond said ring, a plurality of flat plates each disposed in one of said slots and guided by the side and end walls thereof, each plate forming a vane having outwardly projecting legs straddling said ring and having a running fit therewith, said ring, said rotor and each pair of adjacent vanes defining a fluid chamber which expands and contracts alternately in successive half revolutions of said rotor, fluid inlet and outlet recesses alternately connected to each of said chambers during each revolution of the rotor, and valve means responsive to turning of said rotor and operable to connect the inner end of said vane slots to the higher pressure one of said recesses during that portion of each revolution when the adjacent chamber is under the same high pressure, said legs being exposed at their outer ends to a pressure substantially lower than said high pressure so as to reduce the area of the outer end of the vane subjected to the high pressure in the adjacent chamber.

3. A fluid displacement device having, in combination, a rotor having radial vane slots spaced therearound, vanes slidable in said slots, an eccentrically mounted ring enclosing said rotor and vanes and cooperating therewith to provide a plurality of chambers, each of which expands and contracts alternately in moving to the successive dead-center positions, means providing high and low fluid pressure recesses respectively connected to each of said chambers during expansion and contraction thereof, each of said vanes having an inwardly facing pressure area larger than the area of its outer end, which is engaged by the interior of said ring, and valve means responsive to turning of said rotor and operable to transmit fluid pressure from the high pressure one of said recesses to the inner surface of each vane while the adjacent fluid chamber is under high pressure.

4. A fluid displacement device having, in combination, a rotor having radial vane slots spaced therearound, vanes slidable in said slots, an eccentrically mounted ring enclosing said rotor and vanes and cooperating therewith to provide a plurality of chambers, each of which expands and contracts alternately in moving to the successive dead-center positions, means providing high and low fluid pressure recesses respectively connected to each of said chambers during expansion and contraction thereof, each of said vanes having a portion thereof overlapping an end of said ring and exposed to low pressure, and valve means responsive to turning of said rotor and operable to transmit fluid pressure from the high pressure one of said recesses to the inner end portion of each vane slot while the adjacent fluid chamber is under high pressure.

5. A fluid displacement device having, in combination, a rotor having radial vane slots spaced therearound, vanes slidable in said slots, an eccentrically mounted ring enclosing said rotor and vanes and cooperating therewith to provide a plurality of chambers, each of which expands and contracts alternately in moving to the successive dead-center positions, means providing high and low fluid pressure recesses respectively connected to each of said chambers during expansion and contraction thereof, each of said vanes having inner and outer end surfaces of substantially equal effective areas with part of the outer area exposed exteriorly of said chambers to fluid at a pressure substantially lower than said high pressure, and valve means responsive to turning of said rotor and operable to transmit fluid pressure from the high pressure one of said recesses to the inner end surface of each vane substantially throughout the period that the adjacent fluid chamber is under high pressure.

6. A fluid displacement device having, in combination, a housing having low and high pressure fluid recesses, a ring journaled in said housing, a member rigid with said housing and projecting through said ring eccentrically thereof, a rotor journaled on the exterior of said member and having end flanges straddling said ring, said rotor having radially disposed guide slots opening outwardly and angularly spaced apart, vanes guided in said slots and bearing outwardly against said ring, each pair of adjacent vanes cooperating with said rotor and the interior of said ring to form a fluid chamber which expands and contracts alternately during each revolution of said rotor, ports formed in said member and said rotor and cooperating to connect each of said chambers to one of said recesses during contraction of the chamber and to the other recess during expansion thereof, and value means comprising passages in said rotor and ports in said member cooperating to connect the inner end of each of said vane slots to said high pressure recess during more than a half revolution including the arc during which each adjacent chamber is connected to the high pressure recess, said passages and ports connecting the vane slot to said low pressure recess during the remaining part of the rotor revolution.

7. A fluid displacement device having, in combination, a housing having fluid inlet and outlet recesses, a ring journaled in said housing, a member rigid with said housing and projecting through said ring eccentrically thereof, a rotor journaled on the exterior of said member and having end flanges straddling said ring, said rotor having radially disposed guide slots opening outwardly and angularly spaced apart, vanes guided in said slots and bearing outwardly against said ring, each pair of adjacent vanes cooperating with said rotor and the interior of said ring to form a fluid chamber which expands and contracts alternately during each revolution of said rotor, ports formed in said member and said rotor and cooperating to connect each of said chambers to one of said recesses during contraction of the chamber and to the other recess during expansion thereof, and passages in said rotor cooperating with ports in said member to connect the inner end of each of said vane slots to said inlet recess over an arc overlapping both dead-center positions and to the outlet recess for substantially the remainder of the revolution.

8. A fluid displacement device having, in combination, a housing having low and high pressure fluid recesses, a ring journaled in said housing, a member rigid with said housing and projecting through said ring eccentrically thereof, a rotor journaled on the exterior of said member and having end flanges straddling said ring, said rotor having radially disposed guide slots opening outwardly and angularly spaced apart, vanes guided in said slots and bearing outwardly against said ring, each pair of adjacent vanes cooperating with said rotor and the interior of said ring to form a fluid chamber which expands and contracts alternately during each revolution of said rotor, means including valves actuated in time relation to the turning of said rotor and operable to admit fluid from said one of said recesses to each of said chambers during contraction of the chamber and to the other chamber during expansion thereof, the inner end portion of each vane having an inwardly facing surface of greater effective area than that part of the outer end surface of the vane engaging said ring, and valve means responsive to turning of said rotor and operable to connect the inner end of each vane slot to said high pressure recess throughout the period of connection of each adjacent chamber to such recess and to connect the slot to said low pressure recess during substantially the remainder of the revolution.

9. A fluid displacement device having, in combination, a rotatable rotor, a ring encircling said rotor and rotatably mounted eccentrically thereof, flanges on said rotor engaging the ends of said ring, radial slots formed in said rotor and said flanges and opening outwardly, a plurality of vanes each slidable in said slots for engagement with the internal surface of said ring and having legs projecting outwardly across the ends of said ring, said rotor, said ring, and the adjacent vanes forming a fluid chamber of variable volume, and means on at least one of said legs engaging said ring and limiting the inward movement of the associated vane and thereby retaining said legs in engagement with said ring ends.

10. A fluid displacement device having, in combination, a rotatable rotor, a ring encircling said rotor and rotatably mounted eccentrically thereof, flanges on said rotor engaging the ends of said ring, radial slots formed in said rotor and said flanges and opening outwardly, and a plurality of vanes each slidable in said slots for engagement with the internal surface of said ring and having legs projecting outwardly across the ends of said ring, said rotor, said ring and the adjacent vanes forming a fluid chamber of variable volume, and at least one of said legs being connected to the vane body for some degree of edgewise movement relative thereto and exposed on its outer edge to the fluid pressure in the adjacent chamber and urged thereby against the end of said ring.

11. A fluid displacement device having, in combination, a rotatable rotor, a ring encircling said rotor and rotatably mounted eccentrically thereof, flanges on said rotor engaging the ends of said ring, radial slots formed in said rotor and said flanges and opening outwardly, and a plurality of vanes each slidable in said slots for engagement with the internal surface of said ring and having legs projecting outwardly across the ends of said ring, said rotor, said ring, and the adjacent vanes forming a fluid chamber of variable volume, at least one of said legs being separable from the body of the vane and having a tongue and groove connection therewith.

12. A fluid displacement device having, in combination, a rotatable rotor, a ring encircling said rotor and rotatably mounted eccentrically thereof, flanges on said rotor engaging the ends of said ring, radial slots formed in said rotor and said flanges and opening outwardly, a plurality of vanes each slidable in one of said slots and adapted for engagement with the internal surface of said ring, said rotor, said ring, and the adjacent vanes forming a fluid chamber of variable volume, each of said vanes having legs projecting outwardly across the ends of said ring, and a detachable connection joining at least one of said legs and the vane body, said connection comprising a notch and a mating lug engageable therein.

13. A fluid displacement device having, in combination, a rotatable rotor, a ring encircling said rotor and rotatably mounted eccentrically thereof, flanges on said rotor engaging the ends of said ring, radial slots formed in said rotor and said flanges and opening outwardly, a plurality of vanes each slidable in one of said slots and adapted for engagement with the internal surface of said ring, said rotor, said ring, and the adjacent vanes forming a fluid chamber of variable volume, each vane having legs projecting outwardly across the ends of said ring, and a detachable connection joining at least one of said legs and said vane body, said connection comprising a notch and a mating lug interengageable by relative movement between the vane body and the leg in a direction transversely of the plane of the body.

14. A reversible fluid displacement device comprising a cylindrical valve member having two fluid recesses therein, a rotor rotatable about said member and having radial slots angularly spaced therearound, vanes slidable in said slots, an eccentric ring encircling said vanes and cooperating with each pair of adjacent vanes and said rotor to define a fluid chamber which expands and contracts alternately in each revolution of the rotor, means supporting said ring for adjustment toward and across the rotor axis to progressively reduce and then reverse the eccentricity of the ring, each of said chambers having a port opening inwardly, two arcuate outwardly opening grooves angularly spaced around said valve member and respectively communicating with said recesses, a port through said rotor opening inwardly from each of said chambers and cooperating with said grooves to connect the chamber to the respective recesses alternately in successive half revolutions of the rotor, a port through said rotor opening inwardly from each of said vane slots to register with said grooves through angles less than the circumferential lengths of the grooves, ports in said member separated from said grooves and adapted to register with each slot port while the latter is out of registry with one of said grooves and while the adjacent chamber is in register therewith, and means including automatic check valves for admitting fluid to said separated ports from whichever one of said recesses is at the higher pressure.

15. A reversible displacement device comprising a support having two fluid recesses, a rotor journaled on said support and having radial slots angularly spaced therearound, vanes slidable in said slots, an eccentric ring encircling said vanes and cooperating with each pair of adjacent vanes and said rotor to define a fluid chamber which expands and contracts alternately in each revolution of the rotor, means supporting said ring for adjustment toward and across the rotor axis to progressively reduce and then reverse the throw of the eccentric, valve means responsive to the rotation of said rotor and operable to connect each of said chambers first to the high pressure one of said recesses and then to the other recess in successive half revolutions of said rotor, said valve means connecting each of said vane slots to said recesses for less than half revolutions of the rotor, and other valve means operable selectively according to which of said recesses is at the higher pressure to admit high pressure fluid from such recess to each vane slot during the remainder of the half revolution that the adjacent chamber is under high pressure.

16. A fluid displacement device having, in combination, a rotatable rotor, a ring encircling said rotor and rotatably mounted eccentrically thereof, flanges on said rotor engaging the ends of said ring, radial slots formed in said rotor and said flanges and opening outwardly, a plurality of vanes each slidable in said slots and adapted for engagement with the internal surface of said ring, each vane having legs projecting outwardly across the ends of said ring and being shiftable edgewise relative to the body of the vane into engagement with said ring ends, and means for admitting pressure fluid to said slots beneath said vanes whereby to urge the latter outwardly against said ring, said vane legs having pressure areas on their outer margins exposed to the fluid in said slots whereby the legs are urged toward each other into sealing contact with the ends of said ring.

17. A fluid displacement device having, in combination, a rotatable rotor, a ring encircling said rotor and rotatably mounted eccentrically thereof, flanges on said rotor engaging the ends of said ring, radial slots formed in said rotor and said flanges and opening outwardly, a plurality of vanes, each slidable in one of said slots and adapted for engagement with the internal surface of said ring, each vane having legs projecting outwardly acrosss the ends of said ring, and tongue and groove connections between said legs and the body of the associated vane permitting edgewise shifting of the legs into sealing engagement with the ends of said ring.

18. A fluid displacement device having, in combination, a rotatable rotor, a ring encircling said rotor and rotatably mounted eccentrically thereof, flanges on said rotor engaging the ends of said ring, outwardly opening slots angularly spaced around said rotor, a plurality of vanes slidable in said slots for engagement with the internal surface of said ring and cooperating with said rotor and said ring to form fluid chambers each of which expands and contracts alternately in each revolution of the rotor, the inner end of each vane having an effective pressure area greater than the area of that part of the outer end engaging said ring, means providing fluid passages at high and low pressure, valves responsive to turning of said rotor and operable during each revolution of said rotor to connect each of said chambers successively to said low and high pressure passages, and valves responsive to turning of said rotor and operable to connect said fluid low and high pressure passages to the inner end of each vane slot successively and during the parts of each revolution of the rotor when the chamber adjacent such slot is under low and high pressure respectively.

19. A fluid displacement device having, in combination, a stationary member, a rotor rotatably supported thereon, a ring encircling said rotor and rotatably mounted eccentrically thereof, flanges on said rotor engaging the ends of said ring, outwardly opening slots angularly spaced around said rotor, a plurality of vanes slidable in said slots for engagement with the internal surface of said ring and cooperating with said rotor and said ring to form fluid chambers each of which expands and contracts alternately in each revolution of the rotor, the inner end of each vane having an effective pressure area greater than the area of that part of the outer end engaging said ring, means in said member providing fluid passages at high and low pressure, valves responsive to turning of said rotor and operable during each revolution of said rotor to connect each of said chambers successively to said low and high pressure passages, and valves responsive to turning of said rotor and operable to connect said fluid low and high pressure passages to the inner end of each vane slot successively and during the parts of each revolution of the rotor when the chamber adjacent said slot is under low and high pressure respectively, said valves each comprising an outwardly opening port in said member coacting with an inwardly opening port in said rotor.

GUNNAR A. WAHLMARK.

References Cited in the file of this patent

UNITED STATES PATENTS

| Number | Name | Date |
|---|---|---|
| 608,401 | Conti | Aug. 2, 1898 |
| 1,965,388 | Ott | July 3, 1934 |
| 2,049,092 | Sturm | July 28, 1936 |
| 2,089,593 | Bailey | Aug. 10, 1937 |
| 2,233,551 | Ott | Mar. 4, 1941 |
| 2,380,819 | Allbaugh | July 31, 1945 |

FOREIGN PATENTS

| Number | Country | Date |
|---|---|---|
| 24,512 | Great Britain | 1908 |